US005626225A

United States Patent [19]
Joyce, Jr.

[11] Patent Number: 5,626,225
[45] Date of Patent: May 6, 1997

[54] MULTIPLE COMPACT DISC SUPPORTING TRAY

[75] Inventor: Michael P. Joyce, Jr., Kinnelon, N.J.

[73] Assignee: Joyce Development Corporation, Rockaway, N.J.

[21] Appl. No.: 546,918

[22] Filed: Oct. 23, 1995

[51] Int. Cl.$^6$ .................................................. B65D 85/57
[52] U.S. Cl. ........................ 206/308.1; 206/309; 206/493
[58] Field of Search .................................. 206/309, 310, 206/308.1, 493

[56] References Cited

U.S. PATENT DOCUMENTS

| | | |
|---|---|---|
| 5,238,107 | 8/1993 | Kownacki . |
| 5,249,498 | 10/1993 | Weisburn et al. ............... 206/308.1 |
| 5,251,750 | 10/1993 | Gelardi et al. . |
| 5,253,751 | 10/1993 | Wipper . |
| 5,285,893 | 2/1994 | Misterka et al. . |
| 5,417,324 | 5/1995 | Joyce et al. . |

FOREIGN PATENT DOCUMENTS

| | | |
|---|---|---|
| 0356539 | 3/1990 | European Pat. Off. . |
| 3425579 | 1/1986 | Germany . |
| 4107218 | 9/1992 | Germany . |
| 2243145 | 10/1991 | United Kingdom .................. 206/310 |

*Primary Examiner*—Jimmy G. Foster
*Attorney, Agent, or Firm*—William Squire

[57] ABSTRACT

A clear plastic box cover hinged to a bottom member includes a relatively brittle clear (translucent or transparent) thermoplastic molded compact disc (CD) receiving tray, all of polystyrene. The tray has a central rosette of inwardly extending resilient fingers each with an upstanding shoulder for resiliently receiving a pair of overlying CDs on one tray side. The shoulders each have two spaced inclined disc receiving sections, one over the other, each section for receiving a disc. The uppermost disc receiving section overhangs and grips the uppermost disc. The lowermost disc is captured by an intervening overhanging section, the uppermost disc and the tray. A plurality of molded radially extending ribs stiffen multiple sets of pairs of opposing fingers to support the discs in case of breakage of the resilient fingers and which alternate with the resilient fingers.

30 Claims, 5 Drawing Sheets

MULTIPLE COMPACT DISC SUPPORTING TRAY

This invention relates to compact disc storage trays, and more particularly, to thermoplastic molded trays for securing a plurality of compact discs in a disc storage package.

Of interest is commonly owned U.S. Pat. No. 5,417,324 filed in the name of Michael P. Joyce et al. and incorporated by reference herein.

Compact discs generally are plastic circular discs with a central hole and which have recorded digital audio information on spiral tracks formed in a surface thereof about the hole. These discs are typically stored in a protective thermoplastic molded package comprising a bottom member and a cover hinged to the bottom member. The cover snaps to the bottom member in a closed position. A disc storage tray of molded thermoplastic, typically polystyrene, is snap fitted to and in the cavity of the bottom member. The tray has a central opening and a central circular array of fingers extending cantilevered radially inwardly in and about the opening. The fingers each include an upstanding shoulder and a finger tip extending radially inwardly from the shoulder. The shoulders and fingers are in an annular array to receive in resilient interference fit the disc rim in the disc central hole. This interference fit resiliently bends the shoulders and the finger tips inwardly toward one another to releasably secure the disc to the shoulders.

The tray being polystyrene, which is relatively brittle, is loaded with rubber to minimize breakage of the resilient fingers when bent by the received disc. The rubber, however, is black, and colors the tray black. The remaining portions of the package including the cover and bottom member, in contrast, are transparent plastic. Polystyrene, without the rubber, is translucent or transparent, i.e., clear without color. A problem with this material is that it is relatively brittle without the loaded rubber.

The aforementioned US patent deals with this brittleness problem by providing additional fingers in the array alternating with the resilient fingers. The additional fingers in the array are stiffened by interconnecting them with a rib structure. As a result, should some of the resilient fingers break due to brittleness, the reinforced stiffened fingers remain to support the disc.

Typically the prior art trays secure a single disc on one side thereof as shown in the aforementioned patent. Many disc packages are available which store multiple discs. This entails providing multiple trays each with a disc on one side. Some trays secure a disc on opposite sides. However, only one disc is secured to each side. See for example the above noted U.S. patent and the patents cited therein.

The present inventor recognizes a need for a disc supporting tray which can hold multiple discs on each side of the tray to further increase the efficiency of the storage package. Such a tray provides increased compact storage of the discs as compared to the prior art disc receiving trays discussed above.

A tray according to the present invention for securing a plurality of disc recording medias thereto comprises a plate having opposing sides and disc securing means upstanding from at least one of the sides for releaseably securing a plurality of the discs in overlying relation to each other and to the at least one side.

In one embodiment, the disc securing means comprises a plurality of first fingers arranged in an annular array, the fingers each having an upstanding first shoulder for receiving the plurality of discs.

In another embodiment, the plate has an opening, the fingers extending inwardly into the opening, the fingers each having a finger tip extending from the shoulder, the shoulders each including disc engaging means for engaging the plurality of discs.

In a further embodiment, the plate defines a plane, the disc retaining means comprising first and second disc retaining portions on each shoulder, the first portion being proximal the plate one side intermediate the plate and second portion, each disc retaining portion being inclined in approximately the same general direction relative to the normal to the plane of the plate.

In a further embodiment, the angle of inclination of the first portion is inclined at an angle less than the second portion, the portions being separated by a step region.

In a still further embodiment, the disc has a given thickness, the first and second portions each have a length in a direction normal to the plate plane greater than the disc thickness, each portion having a subportion for engaging the disc.

Figure 1:
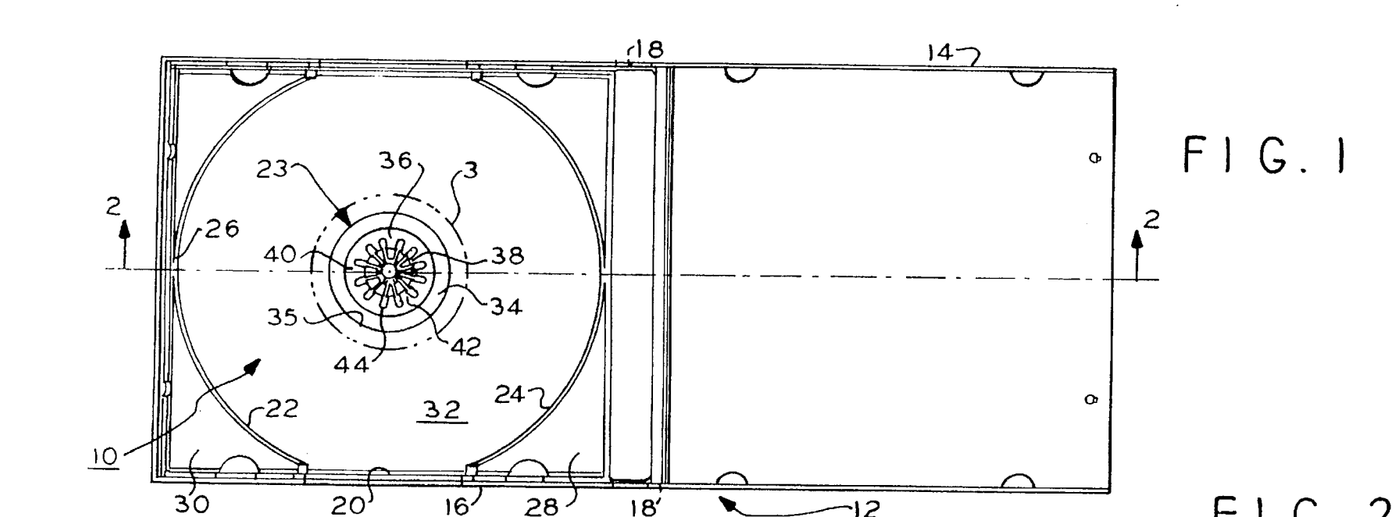
FIG. 1 is a plan top view of a compact disc storage tray and package according to one embodiment of the present invention.
Figures 2, 4:
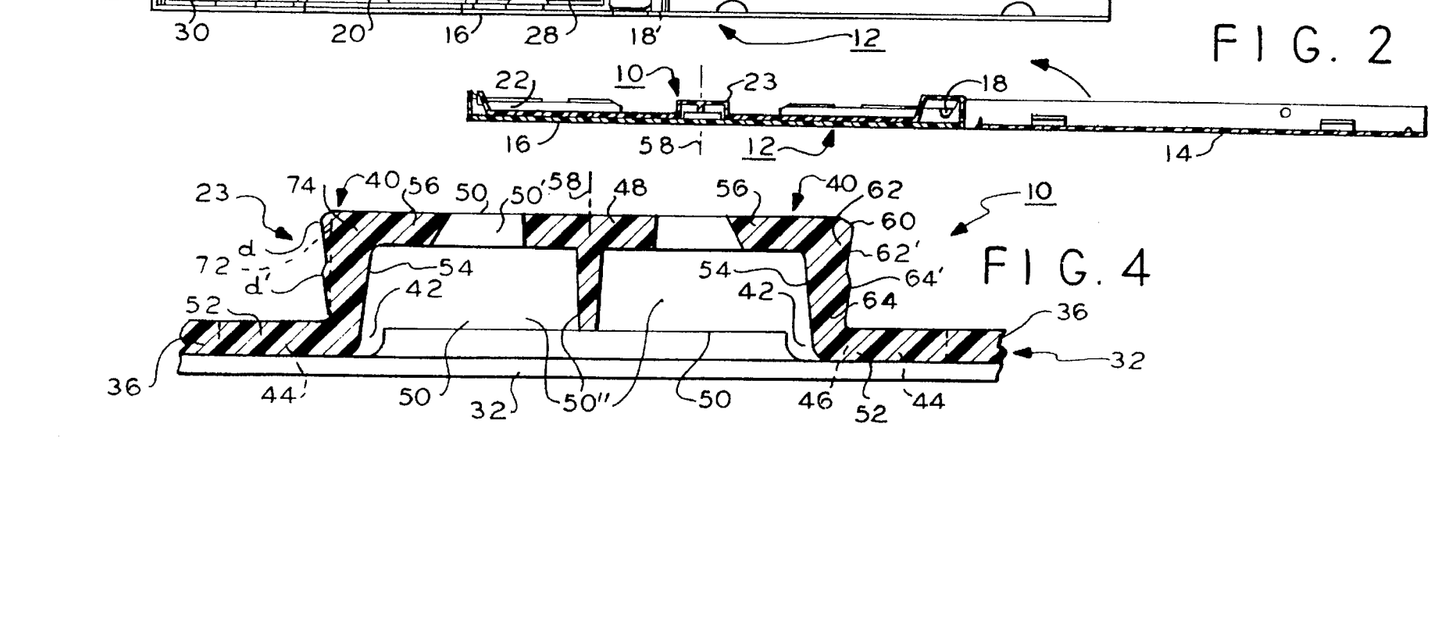
FIG. 2 is a sectional side elevation view of the embodiment of FIG. 1 taken along lines 2—2.
FIG. 4 is a sectional elevation view of the embodiment of FIG. 3 taken along lines 4—4.
Figure 9:
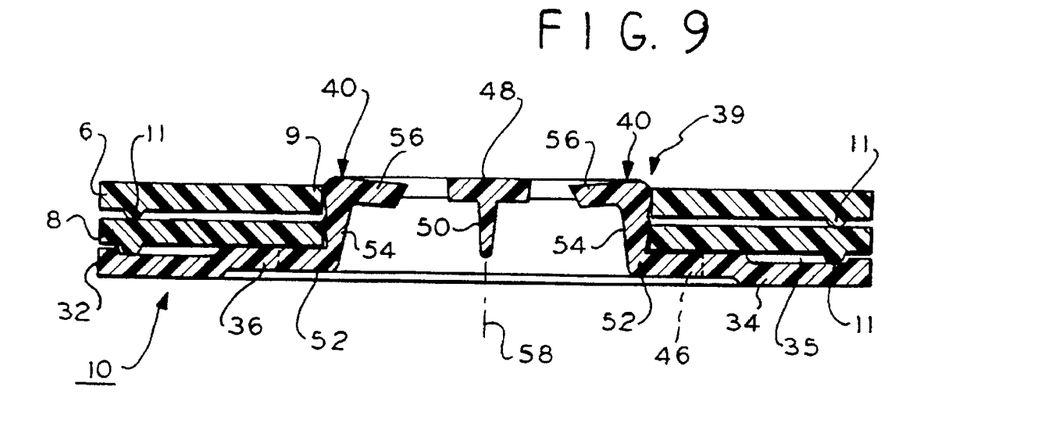
FIG. 9 is a side fragmented sectional elevation view showing two discs secured in place to the disc gripping fingers similar to the view of FIG. 8.

In FIGS. 1 and 2, rectangular tray 10 for receiving a pair of compact discs 6 and 8 (FIG. 9) on one side of the tray, according to an embodiment of the present invention, is installed in a clear compact disc housing 12. Housing 12 comprises a rectangular thermoplastic cover 14 hinged via hinges 18 at one end to an end of a rectangular thermoplastic bottom member 16. The cover 14 snap fits over and to the bottom member 16 to enclose the tray 10 in a cavity 20 formed by the cover 14 and bottom member 16. The housing 12 is sometimes referred to as a "jewel box." The housing 12 protects the compact discs 6 and 8 secured therein to tray 10 from the ambient conditions including dust, dirt and excessive handling.

Figure 8:
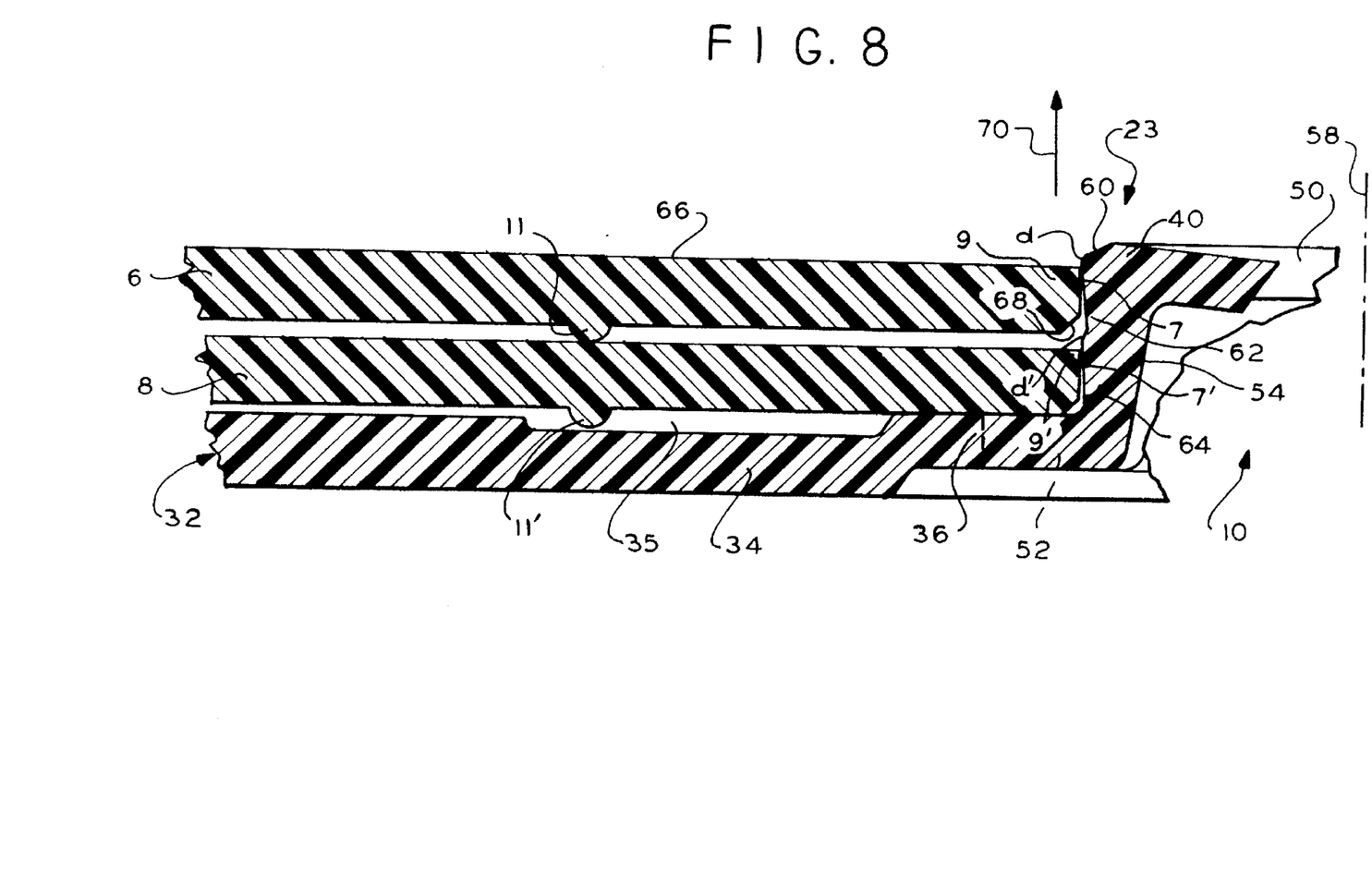
FIG. 8 is an enlarged fragmented sectional elevation view showing the spaced relation of two discs to the supporting tray secured in place by the disc gripping fingers of the present invention.

The thermoplastic discs 6 and 8 each comprises information recorded in a spiral digital encoded track (not shown) formed in one side of a thin circular metal disc substrate encased within a protective circular relatively thin transparent plastic casing. The discs have a circular outer periphery and a central circular concentric opening 7 and 7', respectively (FIG. 8). The openings 7 and 7' are defined by respective rims 9 and 9', the openings being 0.592 inches (15.04 mm) in diameter and manufactured to relatively tight tolerances. These tolerances are such so as to precisely secure the discs in a number of different player machines for accurate playing of the discs. The disc or discs are secured to the tray 10 via the disc rims 9 and 9' at the respective central openings 7 and 7'. The discs also have a given thickness that is held to tight tolerances. The discs 6 and 8 also each have a circular depending rib 11 and 11', respectively, FIG. 8, surrounding the respective openings 7 and 7' and concentric therewith.

In FIG. 1, the tray 10 comprises a rectangular relatively thin member which is conformal with the shape of cavity 20 and is closely received in the cavity 20. The tray 10 is formed of clear molded thermoplastic relatively brittle material such as polystyrene. The term "clear" as used herein includes both translucent and transparent material free of filler material which tends to make the tray opaque such as rubber as employed in prior art trays. The tray 10 comprises a molded sheet material formed with a central disc supporting hub 23, a circular recess 22 formed by two opposing circular segment sides 24 and 26 depending from respective planar walls 28 and 30. Recess 22 has a planar bottom wall 32 which is plate-like. Further description of the bottom member 16 and tray 10 is made in the aforementioned U.S. Pat. No. 5,417,324 incorporated by reference herein.

In the FIGS., bottom wall 32 includes an elevated central disc supporting annular segment 36 surrounding the hub 23. An annular wall segment 34 radially outwardly of and surrounding segment 36 comprises a recess in bottom wall 32 forming a circular channel 35. The channel 35 receives the annular rib 11 (FIGS. 8 and 9) on a disc such as lower disc 8 in spaced relation so that the rib and the radial outward remainder of the disc 8 floats above the respective segment 34 and the radially outward portions of the tray 10 wall 32 radially outwardly beyond segment 34. The disc 8 radially inwardly internal region at opening 7 is supported on the internal tray 10 segment 36 and which region does not have recorded media thereon. The disc radially outward region is spaced above the remaining radial outwardly extending portion of wall 32.

Hub 23 is centrally molded with and in bottom wall segment 36 formed with a rosette 38 of a circular array of resilient fingers 40 and stiffened rigid fingers 42. The fingers 40 and 42 are separated by radial inwardly extending slots 44 terminating in central opening 46 in wall segment 36. A circular cylindrical disc rib member 48 is centrally in opening 46 and interconnected to fingers 42 by ribs 50 which stiffen the fingers 42. Fingers 40 and 42 alternate in the circular array in opening 46.

Figure 10:
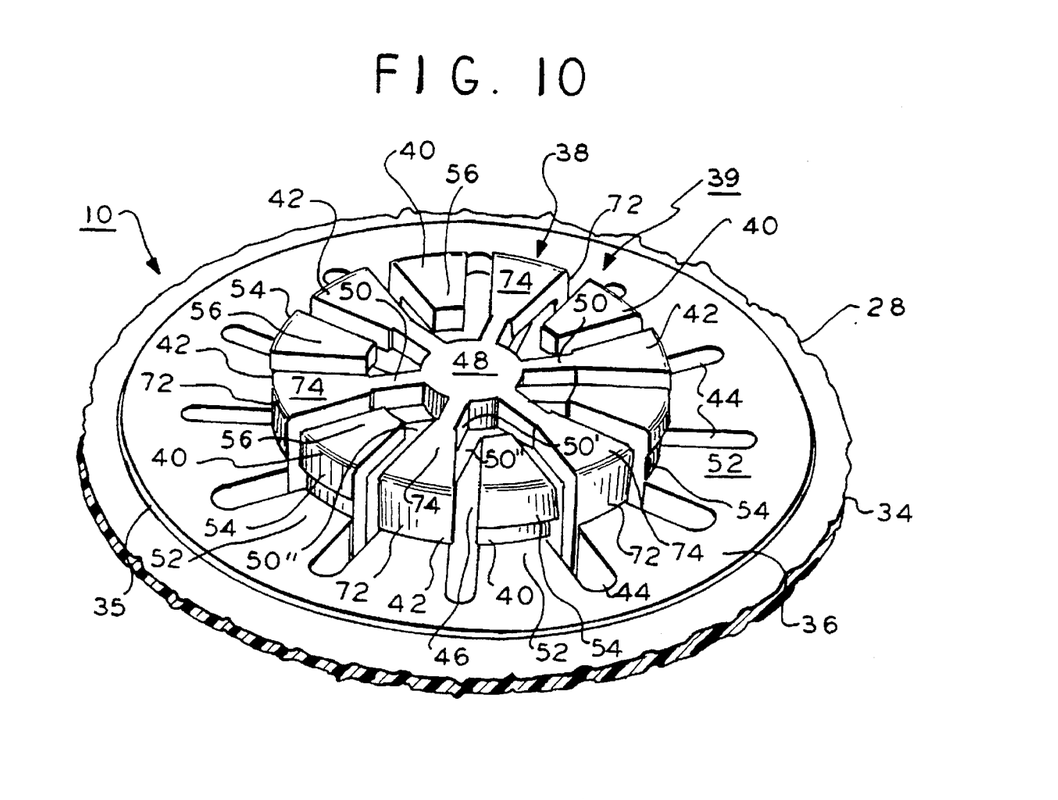
FIG. 10 is an isometric view of the portion of the embodiment shown in FIG. 3.

The fingers 40 comprise a radially inwardly extending portion 52 coplanar with tray bottom wall 32 segment 36 and of the same thickness. A shoulder 54 upstands from a radially inward edge of finger portion 52. A finger tip 56 extends radially inwardly from shoulder 54 overlying opening 46. The fingers in the array extend toward one another, the fingers being spaced in 30° angular increments about the central axis 56. The fingers each subtend an arc less than 30° to allow for the slots 44. The fingers are trapezoidal in plan view. The finger tips 56 normally are radially resilient in a direction toward and away from opposing fingers in the rosette 46. Typically, the finger shoulders 54 bend at portion 52 in response to a radially inward force induced by the insertion of a disc 6 or 8 onto the shoulders 54, FIGS. 8 and 9. The fingers 40 are arranged in radially opposing pairs as are fingers 42, FIGS. 3, 5 and 10.

Each finger 40 including its shoulder 54 is identical therefore the description of one finger is representative. Each finger 40, FIG. 7, has an upper inwardly directed disc 6 or 8 guide chamfer 60 on its outer surface at the junction of the shoulder 54 and tip 56. The shoulder 54 outer surface is formed with two inclined sections 62 and 64 which are inclined relative to the axis 58. The section 62 is inclined at an acute angle α to axis 58 and section 64 is inclined at angle β to axis 58. The section 62 inclined surface 62' angle α preferably is greater than the inclination angle β of section 64 surface 64, e.g., 8° and 7° respectively. The sections 62 and 64 lie in a circular array so that each section forms a compact disc 6 or 8 receiving area. See FIG. 8, for example.

The inside diameter of a typical compact disc is nominally 0.592 inches (15.04 mm) as noted above herein. Also the rim 9 at the disc central opening 7 has a surface that is at a right angle with the compact disc broad surface, such as surface 66 of disc 6, FIG. 8, the lower edge of the disc having a chamfer 68 which mates with chamfer 60 for guiding the disc 6 or 8 onto the shoulders 54. Corresponding structure on disc 8 have the same reference numerals as on disc 6, but primed.

Figure 7:
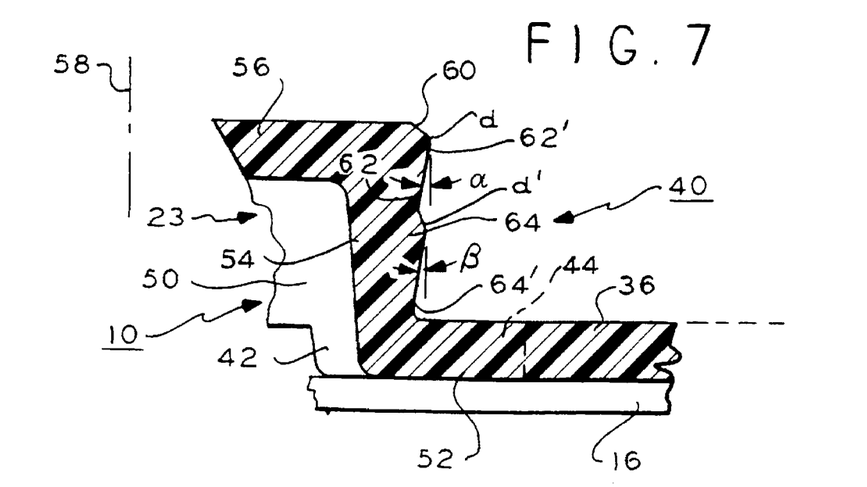
FIG. 7 is an enlarged side elevation fragmented sectional view of the disc gripping portion of a finger taken along lines 7—7 in FIG. 3.

The outer diameter at location d of section 62 is preferably a maximum of about 0.614 inches (15.59 mm), FIG. 7. The outer diameter of section 64 at location d' has a preferably smaller diameter than section 62. The section 64 diameter is preferably a maximum of about 0.602 inches (15.3 mm) at location d' (in the free standing state with no disc attached). As shown in FIG. 8, the location d overhangs the rim 9 at the disc edge at opening 7 of the upper disc 6 and the location d' overhangs the rim 9' at the disc 8 edge at opening 7'.

In FIG. 8, the inclined surface of section 62 has a height parallel to axis 58 that is greater than that of the disc 6 thickness in this direction. As a result, the section 62 portion surface 62' just below and at location d overhangs the disc 6 at the rim 9 edge locking the disc 6 with resilient forces precluding the disc 6 from easily disengaging in the direction 70. The disc 6 rib 11 rests on the upper surface of lower disc 8. Only the upper corner of rim 9 at opening 7 is gripped by surface 62' of section 62.

The angles of surfaces 62' and 64', FIG. 7, and the relative dimensions of the diameters d and d' are such that the lower disc 8 is also gripped while the upper disc 6 is gripped. These angles and diameters are arranged so that both discs are locked in place resiliently by the overhanging portions at locations d and d'. The location d' is separated from surface 62' of section 62 by a step. The surfaces 62' and 64' of all of the shoulders 54 are respectively coplanar in the annular array for receiving the corresponding discs 6 and 8.

The relative diameters and angles of inclination of the inclined surfaces 62' and 64' is critical to insure that at least the uppermost disc 6 is secured at all times when both discs are present. Also, either disc 6 or disc 8 alone must be gripped by the shoulders 54 regardless the presence of the other disc. That is, a lower disc 8 alone might be present with no upper disc 6, or the upper disc 6 might be present with no lower disc 8. In all of these latter circumstances, the single disc when present should be gripped by either section 62 or 64 without disengaging from the hub 23. Yet the shoulders must hold the combined discs 6 and 8 to the hub 23 when both discs are present.

In the latter situation, FIG. 8, it will occur that as long as the upper disc is gripped by the section 62, the lower disc 8 is captured between the upper disc 6 rib 11 and the tray segment 36. In this case, the lower disc need not be gripped as tightly as the upper disc 6, but should exhibit a minimum amount of lateral play in the plane of the disc (left and right in the drawing figure). Due to manufacturing tolerances some play might be present between the lower disc 8 and the hub 23 finger surfaces 64' or the lower disc gripped not as tightly as the upper disc. This is acceptable as long as the upper disc 6 is gripped securely by the section 62 of the fingers 40. Therefore, regardless the relative dimensions of the gripping surfaces 62' and 64', it is important that both surfaces grip a disc without the presence of a second disc and that at least the upper disc is gripped securely when both discs are present as in FIGS. 8 and 9. To this extent both surfaces 62' and 64' remain inclined as shown in FIG. 8 when the discs are secured in place thereto. Without the upper disc 6 in place, the fingers 40 will return radially outwardly somewhat to better grip the lower disc. Thus removal of the upper disc does not degrade the integrity of the gripping action on the lower disc 8 but enhances such action.

It will occur that the relative dimensions given herein are by way of example, and not limitation. Other embodiments of the hub 23 can also secure two tandem secured discs in the relationship described above where both discs are on the same side of the tray 10. For example, in place of inclined surfaces, the shoulders 54 section 62 may have a radially outwardly extending rib (not shown) at location d collectively forming an annular rib on all of the shoulders of the fingers corresponding to fingers 40 and with no inclined surface 62', but rather a surface normal to the plane of segment 36.

Similarly, the section 64 may be defined by a radially outwardly extending rib (not shown) at location d' collectively forming on all of the shoulders of the fingers corresponding to fingers 40 a second annular rib with no inclined surface 64'. The locations d and d' effectively collectively form such annular ribs by eliminating the inclination of the surfaces 62' and 64'. These latter ribs would secure the lower and upper discs by a snap fitting action over these ribs as the fingers bend radially inwardly during insertion of the discs over the hub 23. These ribs then would capture the discs therebetween.

Figures 3, 11:
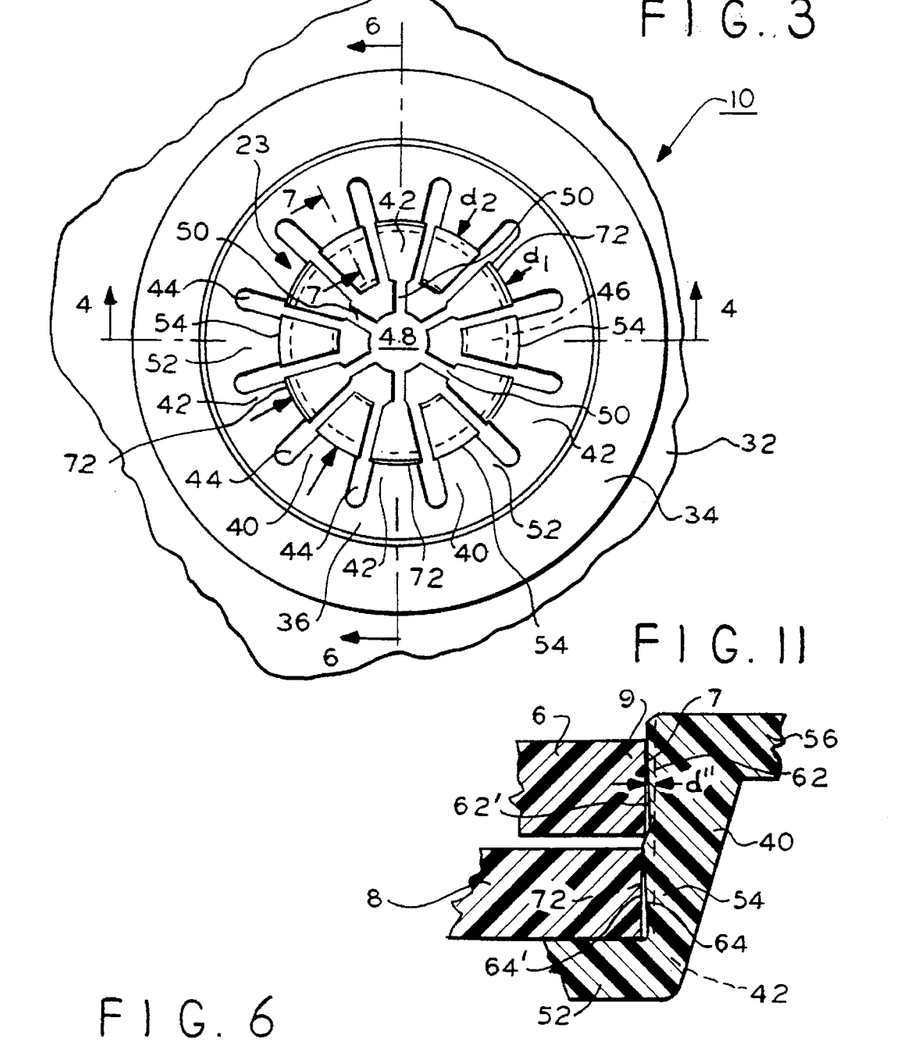
FIG. 3 is a more detailed plan top view of the disc gripping portion of the embodiment of FIG. 1 taken in region 3 of FIG. 1.
FIG. 11 is a detailed fragmented sectional side elevation view of a gripping finger with two discs similar to the view of FIG. 8.
Figure 5:
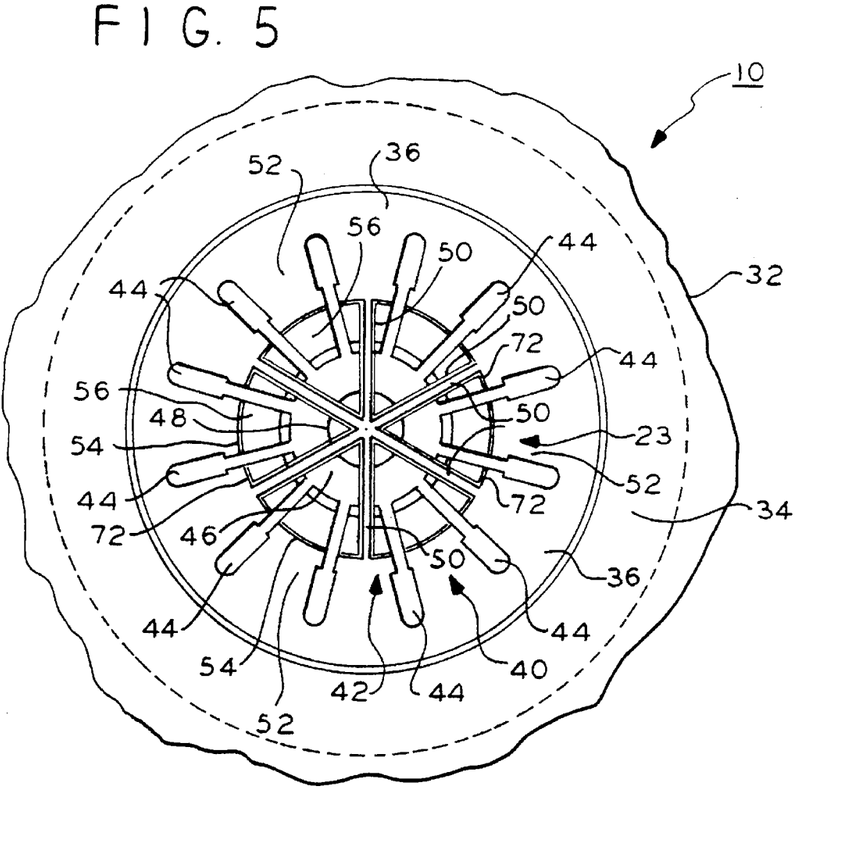
FIG. 5 is a plan bottom view of the embodiment of FIG. 1 taken in region 3.
Figure 6:
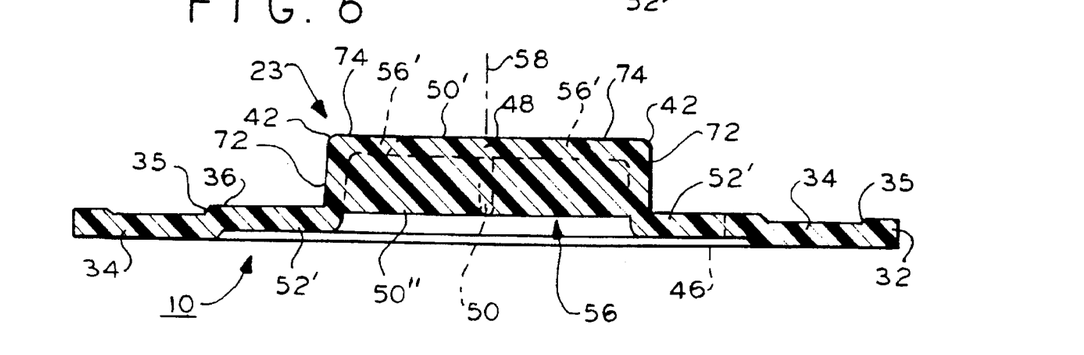
FIG. 6 is a fragmented sectional side elevation view of the embodiment of FIG. 3 taken along lines 6—6.

In FIGS. 3, 5–6, fingers 42 are identical and therefore a description of one finger is representative. Finger 42 comprises a finger portion 52' which is substantially the same as finger portion 52 of fingers 40 and defined by slots 44. A shoulder 72 upstands from the inwardly extending end of portion 52'. As shown in FIG. 6, the shoulder 72 is normal to segment 36 and portions 52'. A finger tip 74 extends radially inwardly from shoulder 72 at the shoulder 72 upper end.

The rib 50 is integral with and interconnected to the finger tip 74 and shoulder 72. The rib 50 comprises a relatively wider upper portion 50' interconnected to rib member 48 and the finger tip 74 and of the same thickness. The rib 50 also has a relatively thinner tapered lower portion 50", FIG. 4, which is integral with and interconnected to the shoulder 72 and the finger tip 74. The fingers 42 are immobile due to the rib 50 and member 48 which stiffens and makes the fingers 42 rigid. The fingers 42 are arranged in opposing pairs and extend radially inwardly toward one another as do fingers 40.

The shoulders 72 of the fingers 42 have a diametrical dimension $d_1$, FIG. 3, smaller than the maximum diameter $d_2$, for example 0.614 inches (15.59 mm), of the resilient fingers 40 at locations d. Thus, there is a diametrical clearance d", FIG. 11, between the annular array of shoulders 72 of fingers 42 and the annular array of shoulders 54 of fingers 42. For example, the outer diameter of the shoulders 72 may be 0.584 inches (14.84 mm) as compared to the inner diameter of the central opening of the discs 6 and 8 which may be 0.592 inches (15.04 mm). Consequently, a disc 6 or 8 is loosely held by shoulders 72 alone.

The shoulders 72 provide support for the discs 6 and 8 should the fingers 40 break at the junctions of their shoulders 54 with the segment 36 when fabricated of brittle thermoplastic material. That is, should several of the resilient fingers break, the intervening rigid fingers provide support for the discs 6 and 8 in cooperation with the remaining resilient fingers 40. Also, the rigid fingers 42 may prevent the resilient fingers 40 from bending inwardly too far assisting in precluding such breakage. Without such breakage the discs are held to the hub 23 solely by the resilient fingers 42.

It will occur that various other modifications may be made to the described embodiments by one of ordinary skill in this art, which embodiments are given by way of illustration and not limitation. For example while a clear plastic is preferred, it will occur that colored plastics may also be used whether clear or opaque to color coordinate the tray to the package. Also, while two overlying discs are shown in the referred embodiment, three or more overlying discs on one side of the tray can be secured by dimensioning the disc receiving hub accordingly. In the alternative, alternate or other arrangement of the fingers may be arranged to grip and secure a different one of the multiple discs. For example, one set of fingers in the array may grip only the lower disc while a second set of fingers in the array may grip only the upper disc. The shoulders of such discs are dimensioned to achieve such gripping. By way of further example, the shoulders of some fingers loosely receive a disc at an upper portion and resiliently grip a disc at a lower portion. The shoulders of others of the fingers are dimensioned so that the upper portion thereof resiliently grips a disc and the lower portion thereof loosely receives the lower disc.

The stiffened rigid fingers may alternate with the resilient fingers in the annular array. Also, the fingers may secure discs on opposing sides of the disc storage tray. The scope of the invention is as defined in the appended claims, the description being given by way of example and not limitation.

What is claimed is:

1. A tray assembly including a plurality of compact disc recording medias comprising:
    a plurality of said compact disc recording medias;
    a plate having opposing sides; and
    compact disc recording media securing means upstanding from one of said sides and releaseably securing said plurality of said compact disc recording medias in overlying relation to each other and in overlying relation to said one side.

2. The tray of claim 1 wherein said disc securing means comprises a plurality of first fingers arranged in an annular array, said first fingers each having an upstanding first shoulder, said first shoulder for receiving at least one of said plurality of disc recording medias.

3. The tray of claim 2 wherein the plate has an opening, said fingers extending inwardly in said opening, said fingers each having a finger tip extending from said first shoulder, said first shoulders for engaging said plurality of disc recording medias.

4. The tray of claim 3 wherein the tray includes further fingers extending inwardly into said opening in said annular array, each further finger including an upstanding second shoulder, said further fingers each having a finger tip extending inwardly from its corresponding second shoulder, and rib means interconnecting and stiffening said further fingers.

5. The tray of claim 4 wherein the first shoulders in the annular array define a first disc recording media receiving and engaging diametrical dimension and the second shoulders define a second diametrical dimension smaller than that of the first diametrical dimension.

6. The tray of claim 3 wherein the plate defines a plane, said disc recording media securing means comprising first and second disc retaining portions on each said shoulder, the first portion being proximal the plate one side intermediate the plate and second portion.

7. The tray of claim 6 wherein each disc retaining portion is inclined in approximately the same general direction relative to the normal to the plane of the plate.

8. The tray of claim 7 wherein the angle of inclination of the first portion is inclined at an angle less than the second portion, the portions being separated by a step region.

9. The tray of claim 8 wherein said disc recording media has a given thickness, said first and second portions each having a length in a direction normal to said plate plane greater than said disc thickness, each portion having a subportion for engaging the disc recording media.

10. The tray of claim 9 wherein said first and second disc retaining portion lengths and said shoulders are dimensioned such that a region of each said first and second portions distal said plate overhangs the disc recording media.

11. The tray of claim 9 wherein said the first and second portions each are arranged such that the first and second portions on said first shoulders each collectively form an annularly arranged set of corresponding disc engaging regions lying in a corresponding plane.

12. The tray of claim 5 wherein the first shoulders have a maximum third diametrical dimension engaging a disc secured thereto, said second shoulders diametrical dimension being smaller than said third diametrical dimension.

13. The tray of claim 2 wherein said first shoulder includes a projection arranged to secure a received disc thereto, said first shoulder being dimensioned to receive said plurality of disc recording media between said projection and said plate.

14. The tray of claim 2 wherein said first shoulder is dimensioned to receive said plurality of disc recording medias, said shoulder on at least a portion of said first fingers including first and second spaced projections defining corresponding first and second disc receiving regions.

15. The tray of claim 1 wherein said disc securing means comprises an annular array of disc securing fingers extending radially inwardly, each finger including an upstanding first shoulder, said first shoulders including projection means for receiving and securing at least two disc recording medias in said overlying relation.

16. The tray of claim 15 wherein said projection means comprises a first array of projections on a first portion of said fingers for receiving a first disc and a second array of projections on a second portion of said fingers for receiving a second disc.

17. The tray of claim 16 wherein the first and second arrays of projections are on each said fingers.

18. A tray assembly including a plurality of compact disc recording medias comprising:
a plurality of said compact disc recording medias;
a plate having opposing sides and a central opening; and
compact disc recording media securing means including a first annular array of fingers extending radially inwardly in said opening, said fingers including a first upstanding shoulder on one of said sides releaseably receiving and securing a plurality of said compact disc recording medias in overlying relation to each other and in overlying relation to said one side, each finger including a tip extending radially resiliently inwardly from its corresponding shoulder.

19. The tray of claim 18 wherein said first shoulders define an annular array of first and second disc recording media receiving regions, each region for receiving a different disc recording media on said at least one side.

20. The tray of claim 19 wherein said first and second regions are separated by a step, each region being formed by a surface on each said shoulders inclined relative to a normal to the plate.

21. The tray of claim 20 wherein the angle of inclination of the first regions is the same and the angle of inclination of the second regions is the same, the angle of inclination of the first regions being different than the angle of inclination of the second regions.

22. The tray of claim 21 wherein said wherein the angle of inclination of the first regions is less than the angle of inclination of the second regions, the first regions each being intermediate the plate and a second region on a shoulder.

23. The tray of claim 21 wherein said angles of inclination are each less than 10°.

24. A tray for securing a plurality of disc recording medias thereto comprising:
a plate having opposing sides; and
disc securing means upstanding from one at least one of said sides for releaseably securing a plurality of said discs in overlying relation to each other and to said at least one side;
said disc securing means comprising an upstanding shoulder on each of a plurality of inwardly extending fingers, each shoulder having an outer disc receiving surface and a pair of spaced ribs on each outer surface, the ribs on said shoulders collectively forming first and second disc receiving regions on said shoulders.

25. A tray for securing a plurality of compact disc recording medias thereto comprising:
a plate having opposing sides and an opening; and
disc recording media securing means upstanding from one of said sides for releaseably securing a plurality of said disc recording medias in overlying relation to each other and in overlying relation to said one side;
said disc recording media securing means comprising a plurality of first fingers arranged in an annular array, said first fingers each having an upstanding first shoulder, said first shoulder for receiving at least one of said plurality of disc recording medias;
said fingers extending inwardly in said opening, said fingers each having a finger tip extending from said first shoulder, said first shoulders for engaging said at least one of said plurality of received disc recording medias;
said tray including further fingers extending inwardly into said opening in said annular array, each further finger including an upstanding second shoulder, said further fingers each having a finger tip extending inwardly from its corresponding second shoulder, and rib means interconnecting and stiffening said further fingers;
the first shoulders in the annular array defining a first disc recording media receiving and engaging diametrical dimension and the second shoulders defining a second diametrical dimension smaller than that of the first diametrical dimension.

26. A tray for securing a plurality of compact disc recording medias thereto comprising:

a plate defining a plane and having opposing sides and an opening;

disc recording media securing means upstanding from one of at least one of said sides for releaseably securing a plurality of said disc recording medias in overlying relation to each other and in overlying relation to said at least one side;

said disc recording media securing means comprising a plurality of first fingers arranged in an annular array, said first fingers each having an upstanding first shoulder, said first shoulder for receiving at least one of said plurality of discs;

said fingers extending inwardly in said opening, said fingers each having a finger tip extending from said first shoulder, said first shoulders for engaging said at least one of said plurality of received disc recording medias; and further fingers extending inwardly into said opening in said annular array, each further fingers including an upstanding second shoulder, said further fingers each having a finger tip extending inwardly from its corresponding second shoulder, and rib means interconnecting and stiffening said further fingers;

said disc recording media securing means comprising first and second disc retaining portions on each said shoulder, the first portion being proximal the plate one side intermediate the plate and second portion;

each shoulder disc retaining portion being inclined in approximately the same general direction relative to the normal to the plane of the plate;

the angle of inclination of the first portion being inclined at an angle less than the second portion, the portions being separated by a step region.

27. A tray for securing a plurality of compact disc recording medias thereto comprising:

a plate having opposing sides; and disc recording media securing means upstanding from one of at least one of said sides for releaseably securing a plurality of said disc securing means in overlying relation to each other and in overlying relation to said at least one side;

said disc recording media securing means comprising a plurality of first fingers arranged in an annular array, said first fingers each having an upstanding first shoulder;

said first shoulder being dimensioned to receive said plurality of disc recording medias, said first shoulder on at least a portion of said first fingers including first and second spaced projections defining corresponding first and second disc recording media receiving regions.

28. A tray for securing a plurality of compact disc recording medias thereto comprising:

a plate having opposing sides; and disc recording media securing means upstanding from one of at least one of said sides for releaseably securing a plurality of said disc recording medias in overlying relation to each other and in overlying relation to said at least one side;

said disc recording media securing means comprising an annular array of disc securing fingers extending radially inwardly, each finger including an upstanding first shoulder, said first shoulders including projection means for receiving and securing at least two disc recording medias in said overlying relation;

said projection means comprising first and second arrays of projections on each said fingers, the first array for receiving a first disc recording media and the second array for receiving a second disc recording media.

29. A tray for securing a plurality of compact disc recording medias thereto comprising:

a plate having opposing sides and a central opening; and disc recording media securing means including a first annular array of fingers extending radially inwardly in said opening, said fingers including a first upstanding shoulder on at least one of said sides for releaseably receiving and securing a plurality of said disc recording medias in overlying relation to each other and to said at least one side, each finger including a tip extending radially resiliently inwardly from its corresponding shoulder;

said first shoulders defining an annular array of first and second disc receiving regions, each region for receiving a different disc on said at least one side;

said first and second regions being separated by a step, each region being formed by a surface on each said shoulders inclined relative to a normal to the plate.

30. A tray for securing a plurality of compact disc recording medias thereto comprising:

a plate having opposing sides; and disc recording media securing means upstanding from one of at least one of said sides for releaseably securing a plurality of said disc recording medias in overlying relation to each other and in overlying relation to said at least one side;

said disc recording media securing means comprising an upstanding shoulder on each of a plurality of inwardly extending fingers, each shoulder having an outer disc receiving surface and a pair of spaced ribs on each outer surface, the ribs on said shoulders collectively forming first and second disc receiving regions on said shoulders.

* * * * *